(12) United States Patent
Gross

(10) Patent No.: US 11,709,022 B2
(45) Date of Patent: Jul. 25, 2023

(54) METAL WICK CRIMPING METHOD FOR HEAT PIPE INTERNALS

(71) Applicant: Westinghouse Electric Company LLC, Cranberry Township, PA (US)

(72) Inventor: David M. Gross, Gibsonia, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 0 days.

(21) Appl. No.: 17/904,732

(22) PCT Filed: Feb. 16, 2021

(86) PCT No.: PCT/US2021/018142
§ 371 (c)(1),
(2) Date: Aug. 22, 2022

(87) PCT Pub. No.: WO2021/167871
PCT Pub. Date: Aug. 26, 2021

(65) Prior Publication Data
US 2023/0070156 A1 Mar. 9, 2023

Related U.S. Application Data

(60) Provisional application No. 62/979,822, filed on Feb. 21, 2020.

(51) Int. Cl.
*F28D 15/04* (2006.01)
*G21C 15/257* (2006.01)

(52) U.S. Cl.
CPC ......... *F28D 15/046* (2013.01); *G21C 15/257* (2013.01); *F28F 2275/061* (2013.01); *F28F 2275/122* (2013.01)

(58) Field of Classification Search
CPC ..... F28D 15/046; F28D 15/04; G21C 15/257; F28F 2275/061; F28F 2275/122
USPC ..................................................... 165/104.26
See application file for complete search history.

(56) References Cited

U.S. PATENT DOCUMENTS

| | | | |
|---|---|---|---|
| 3,680,189 A * | 8/1972 | Noren | F28D 15/0283 29/890.032 |
| 3,786,861 A | 1/1974 | Eggers | |
| 3,821,969 A * | 7/1974 | Sinko | F16L 55/1141 138/89 |
| 4,196,504 A | 4/1980 | Eastman | |
| 4,351,388 A * | 9/1982 | Calhoun | F28D 15/046 165/104.26 |

(Continued)

FOREIGN PATENT DOCUMENTS

WO 2021167871 A1 8/2021

OTHER PUBLICATIONS

International Search Report and Written Opinion for International PCT Application No. PCT/US2021/018142, dated Jun. 1, 2021.

*Primary Examiner* — Tho V Duong
(74) *Attorney, Agent, or Firm* — K&L Gates LLP

(57) ABSTRACT

A wick assembly for use with a heat pipe is disclosed. The wick assembly includes an end plug including a wick receiving area, a wick, and a crimp. A portion of the wick is positioned about the wick receiving area. The crimp is positioned about the portion of the wick and the wick receiving area. The end plug, the portion of the wick, and the crimp are diffusion bonded.

20 Claims, 12 Drawing Sheets

(56) References Cited

U.S. PATENT DOCUMENTS

| | | | |
|---|---|---|---|
| 4,773,476 A * | 9/1988 | Baehrle | F28D 15/02 |
| | | | 29/890.032 |
| 4,811,759 A * | 3/1989 | Billoue | F16L 55/1116 |
| | | | 29/402.09 |
| 5,379,830 A * | 1/1995 | Itoh | H01L 23/427 |
| | | | 29/890.032 |
| 10,371,458 B2 | 8/2019 | Sun et al. | |
| 2013/0048250 A1 | 2/2013 | Pokharna et al. | |
| 2014/0185288 A1* | 7/2014 | Cunningham | F21K 9/23 |
| | | | 362/235 |
| 2018/0066899 A1* | 3/2018 | Hsieh | B23K 15/008 |
| 2019/0113289 A1* | 4/2019 | Lin | F28D 15/0283 |

* cited by examiner

METAL WICK CRIMPING METHOD FOR HEAT PIPE INTERNALS

CROSS-REFERENCE TO RELATED APPLICATIONS

This application is a U.S. National Stage Entry under 35 U.S.C. § 371 of International Patent Application No. PCT/US2021/018142, entitled METAL WICK CRIMPING METHOD FOR HEAT PIPE INTERNALS, filed Feb. 16, 2021, which claims the benefit under 35 U.S.C. § 119 (e) of U.S. Provisional Application Ser. No. 62/979,822 filed Feb. 21, 2020, the entire disclosures of which are hereby incorporated by reference herein.

GOVERNMENT CONTRACT

This invention was made with government support under Contract FOA-1817 awarded by the Department of Energy. The government has certain rights in the invention.

BACKGROUND

This invention relates generally to heat pipes used in heat transfer systems, and more particularly, to wicks within the heat pipes that are configured to transfer the working fluid of the heat pipe from a condenser region of the heat pipe to an evaporator region.

A heat pipe is a hermetically sealed, two-phase heat transfer component used to transfer heat from a primary side (evaporator section) to a secondary side (condenser section). FIG. 1, as an example, illustrates a heat pipe 100 comprising the aforementioned evaporator section 102 and condenser section 106, along with an adiabatic section 104 extending therebetween. The heat pipe 100 further includes a working fluid (such as water, liquid potassium, sodium) and a wick structure 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses and gives off its latent heat. The condensed liquid is then returned to the evaporator section 102 through the wick structure 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

In nuclear systems, heat pipes are utilized by placing the evaporator section of the heat pipe within the reactor core containing nuclear fuel and the condenser section is placed near heat exchangers. The nuclear fuel vaporizes the working fluid and heat exchangers absorb the latent heat at the condenser section. Example heat pipes in nuclear applications are described in U.S. Pat. Nos. 5,684,848, 6,768,781, and U.S. Patent Application Publication No. 2016/0027536, all of which are incorporated by reference in their entirety.

Another example use for heat pipes in nuclear systems is with micro-reactors, which are nuclear reactors that generate less than 10 MWe and are capable of being deployed for remote applications. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. The eVinci system is a heat pipe cooled reactor power system that utilizes heat pipes to act as passive heat removal devices that efficiently move thermal energy out of the reactor core to heat exchangers.

The heat pipes used in the micro-reactors experience extreme operating temperatures (>850° C.) and requires an internal wick that is made from materials that can withstand these temperatures and still properly function. This wick can be constructed from a wire mesh that is rolled and diffusion bonded together into a tube-like structure. The wick tube allows for the working fluid within the heat pipe to pass through it radially (such as after the latent heat is given off and the working fluid is absorbed by the wick) and along its axis (transferring the working fluid back toward the evaporator section with capillary action) while remaining rigid.

In order for the system to function properly, one end of the wick tube has to be sealed to an internal end of the heat pipe. One way this can be accomplished is by coupling the wick to a end plug, and then welding the end plug to the heat pipe. When the wick tube is coupled to the end plug, it must hold pressure greater than the expected pressure difference of the operating wick. This pressure differential is dependent on pore size of the wick, which in turn is dependent on number of layers of the rolled wick and the diffusion bonding process.

The wicks generally have an extremely thin wall (~0.014 inches) and are not constructed of solid metal, so standard thin wall tubing/welding methods cannot easily be used to couple the wick to the end plug. In addition, attempting to use welding methods can cause the wick to delaminate, effectively destroying the wicks ability to retain internal pressure as needed. In addition, attempting to use swaging methods is not possible due to geometrical constraints on the system.

It is the goal of the present disclosure to provide a way to fuse the wick to the end plug such that it holds pressure greater than the expected pressure difference of the operating wick without compromising the wick's ability to perform its intended design functions, such as absorbing and transferring the working fluid from the condenser section of the heat pipe to the evaporator section of the heat pipe.

SUMMARY

In various embodiments, a wick assembly for use with a heat pipe is disclosed including an end plug including a wick receiving area, a wick, and a crimp. A portion of the wick is positioned about the wick receiving area. The crimp is positioned about the portion of the wick and the wick receiving area. The end plug, the portion of the wick, and the crimp are diffusion bonded.

In various embodiments, a heat pipe is disclosed including an evaporator region, an adiabatic region, a condenser region, and a wick assembly. The wick assembly includes an end plug including a first engagement portion and a wick including a second engagement portion configured to overlap the first engagement portion. The wick assembly further includes a crimp including a third engagement portion configured to overlap the first engagement portion and the second engagement portion. The first engagement portion, the second engagement portion, and the third engagement portion are diffusion bonded.

In various embodiments, a method of constructing a wick assembly for use with a heat pipe is disclosed. The method includes sliding a portion of a wick over a crimp, forming a wick/crimp assembly, sliding the wick/crimp assembly over a wick receiving area of an end plug, forming a plug/wick/crimp interface, positioning a crimping device about the plug/wick/crimp interface, using the crimping device to crimp the crimp, and using an external heat source to diffusion bond the crimp, the wick, and the end plug.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 2:
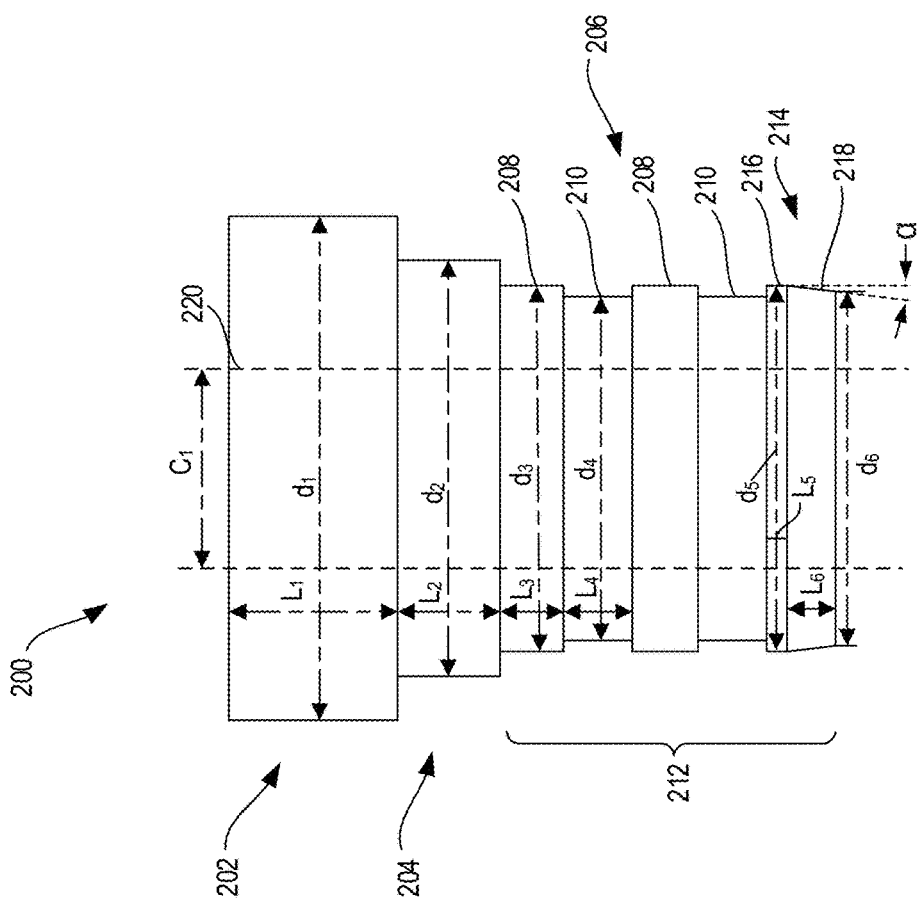
FIG. 2 illustrates an end plug according to one aspect of the present disclosure.

FIG. 2 illustrates an end plug 200 according to one aspect of the present disclosure. The end plug 200 comprises an annual cross-sectional shape. In other embodiments, the end plug 200 can comprise other cross sectional shapes, such as a square cross-sectional shape, a rectangular cross-sectional shape, or a cross-sectional shape that is similar, or at least substantially similar, to the cross-sectional shape of the heat pipe in which the end plug 200 is intended to be utilized with. The end plug 200 can be manufactured or any suitable material that is configured to withstand the high operating temperatures of the heat pipe, such as steel or copper, as examples.

In one aspect, the end plug 200 can include a first end portion 202, a second end portion 206, and an intermediate portion 204 positioned between the first end portion 202 and the second end portion 206. The first end portion 202 is configured to be coupled to an inside end of a heat pipe, such as by welding, adhesive, fasteners, or any other various suitable connection. In one aspect of the present disclosure, the first end portion 202 comprises the largest cross-sectional area compared to the second end portion 206 and the intermediate portion 204. In other aspects, the first end portion 202 comprises a substantially similar cross sectional area compared to the second end portion 206 or the intermediate portion 204. In another aspect, the first end portion 202 comprises the smallest cross-sectional area compared to the second end portion 206 and the intermediate portion 204.

The first end portion 202 can include a first diameter d1 and a first length L1. In one example embodiment, the first diameter d1 can be 0.750" and the first length L1 can be 0.25". In one aspect, the ratio of the first diameter d1 to the first length L1 can be 3:1. In other aspects, the ratio of the first diameter d1 to the first length L1 can be greater than 3:1, such as 4:1, 4.5:1, or 5:1, as examples. In other aspects, the ratio of the first diameter d1 to the first length L1 can be less than 3:1, such as 2:1, 1.5:1, or 1.25:1, as examples.

In one embodiment, the intermediate portion 204 can include a second diameter d2 and a second length L2. In one example embodiment, the second diameter d2 can be 0.615" and the second length L2 can be 0.15". In one aspect, the ratio of the second diameter d2 to the second length L2 can be about 4.1:1. In other aspects, the ratio of the second diameter d2 to the second length L2 can be greater than 4.1:1, such as 5:1, 5.5:1, or 6:1, as examples. In other aspects, the ratio of the second diameter d2 to the second length L2 can be less than 4.1:1, such as 3:1, 2.5:1, or 2:1, as examples.

In one example embodiment, the ratio of the first diameter d1 to the second diameter d2 can be about 1.2:1. In another example embodiment, the ratio of the first diameter d1 to the second diameter d2 can be greater than 1.2:1, such as 1.5:1, 2:1, or 2.5:1, as examples. In another example embodiment, the ratio of the first diameter d1 to the second diameter d2 can be less than 1.2:1, such as 1.1:1, 1.05:1, or 1:1, as examples. In one example embodiment, the ratio of the first length L1 to the second length L2 can be about 1.7:1. In another example embodiment, the ratio of the first length L1 to the second length L2 can be greater than 1.7:1, such as 2:1, 2.25:1, or 2.5:1, as examples. In another example embodiment, the ratio of the first length L1 to the second length L2 can be less than 1.7:1, such as 1.5:1, 1.25:1, or 1:1, as examples.

The second end portion 206 defines a stepped configuration along the length thereof. Stated another way, the second end portion 206 includes grooves 210 defined therein such that the second end portion 206 includes first stepped regions 208 and second stepped regions, or grooves, 210. As illustrated in FIG. 2, the second end portion 206 can include two grooves 210 defined therein. In another embodiment, the second end portion can include one groove 210 defined therein. In another embodiment, the second end portion can include three or more groves 210 defined therein.

The first stepped regions 208 can include a third diameter d3 and a third length L3. In one example embodiment, the third diameter d3 can be 0.542" and the third length L3 can be 0.1". In one aspect, the ratio of the third diameter d3 to the third length L3 can be about 5.4:1. In other aspects, the ratio of the third diameter d3 to the third length L3 can be great than 5.4:1, such as 5.5:1, 6:1, or 6.5:1, as examples. In other aspects, the ratio of the third diameter d3 to the third length L3 can be less than 5.4:1, such as 5:1, 4.5:1, or 4:1, as examples.

The grooves 210 can include a fourth diameter d4 and a fourth length L4. In one example embodiment, the fourth diameter d3 can be 0.512" and the fourth length L4 can be 0.1". In one aspect, the ratio of the fourth diameter d4 to the fourth length L4 can be about 5.1:1. In other aspects, the ratio of the fourth diameter d4 to the fourth length L4 can be great than 5.1:1, such as 5.5:1, 6:1, or 6.5:1, as examples. In other aspects, the ratio of the fourth diameter d4 to the fourth length L4 can be less than 5.1:1, such as 5:1, 4.5:1, or 4:1, as examples.

In one embodiment, the ratio of the third diameter d3 to the fourth diameter d4 can be about 1.1:1. In another example embodiment, the ratio of the third diameter d3 to the fourth diameter d4 can be greater than 1.1:1, such as 1.25:1, 1.5:1, or 2:1, as examples. In another example embodiment, the ratio of the third diameter d3 to the fourth diameter d4 can be less than 1.1:1, such as 1.075:1, 1.05:1, or 1.025:1, as examples.

In one embodiment, the ratio of the third length L3 to the fourth length L4 can be about 1:1. In another example embodiment, the ratio of the third length L3 to the fourth length L4 can be greater than 1:1, such as 1.25:1, 1.5:1, or 1.75:1, as examples. In another example embodiment, the ratio of the third length L3 to the fourth length L4 can be less than 1:1, such as 0.75:1, 0.5:1, or 0.25:1, as examples.

The second end portion 206 can also include a tapered region 214. In one aspect, the tapered region 214 can include a flat, or substantially flat, section 216 and a tapered section 218 extending from the flat section 216. Collectively, the first stepped regions 208, the grooves 210, the flat section 216, and the tapered section 218 define a wick receiving area 212.

In one example embodiment, the flat section 216 can include fifth diameter d5 and a fifth length L5. In one example embodiment, the fifth diameter d5 can be the same, or at least substantially the same, as a diameter of a first stepped region 208, i.e., d3. In other example embodiments, the fifth diameter d5 can be the same, or at least substantially the same, as a diameter to a groove 210, i.e., d4. In one embodiment, the fifth length L5 can be 0.03 inches. In another embodiment, the fifth length L5 could be the same, or at least substantially the same, as one of the third length L3 or the fourth length L4.

In addition, the tapered section 218 extends from the flat section 216 and towards a sixth diameter d6 over a sixth length L6 and at an angle α. In one example embodiment, the sixth diameter d6 can be 0.53", the sixth length can be 0.07" and the angle α can be 5°. Other example embodiments are envisioned wherein the sixth diameter d6 is greater than 0.53 inches (such as 0.535 inches) or less than 0.53 inches (such as 0.5 inches). Other example embodiments are envisioned wherein the sixth length L6 is greater than 0.07 inches (such as 0.1 inches) or less than 0.07 inches (such as 0.05 inches). Other example embodiments are envisioned wherein the angle α is greater than 5° (such as 10°) or less than 0.53 inches (such as 3°).

In one aspect, the end plug 200 can be a hollow end plug 200 with a bore 220 defined completely therethrough that includes a diameter C1. In one example embodiment, the bore diameter C1 is 0.25 inches. Other example embodiments are envisioned wherein the bore diameter C1 is greater than 0.25 inches (such as 0.4 inches) or less than 0.25 inches (such as 0.1 inches). In another example embodiment, the end plug 200 can be a solid end plug with no bore 220 defined therein. In another embodiment, the bore 220 can only extend through the first end portion 202. In another embodiment, the bore 220 can extend through the first end portion 202 and the second end portion 206. In another embodiment, the bore 220 can extend through only the wick receiving area 212.

Figure 1:
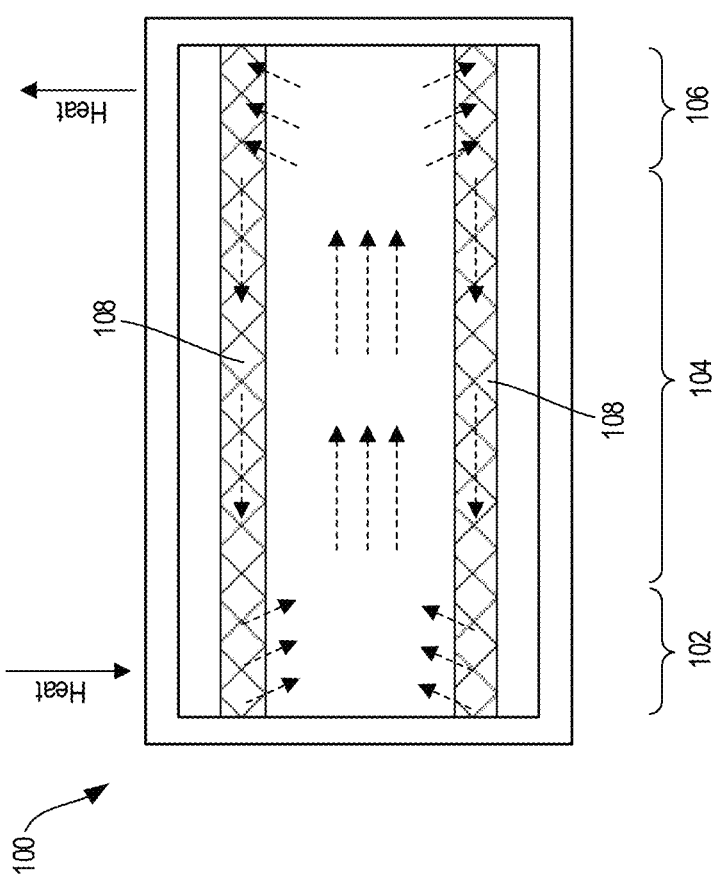
FIG. 1 illustrates working fluid of a heat pipe moving through a heat pipe.
Figure 3:
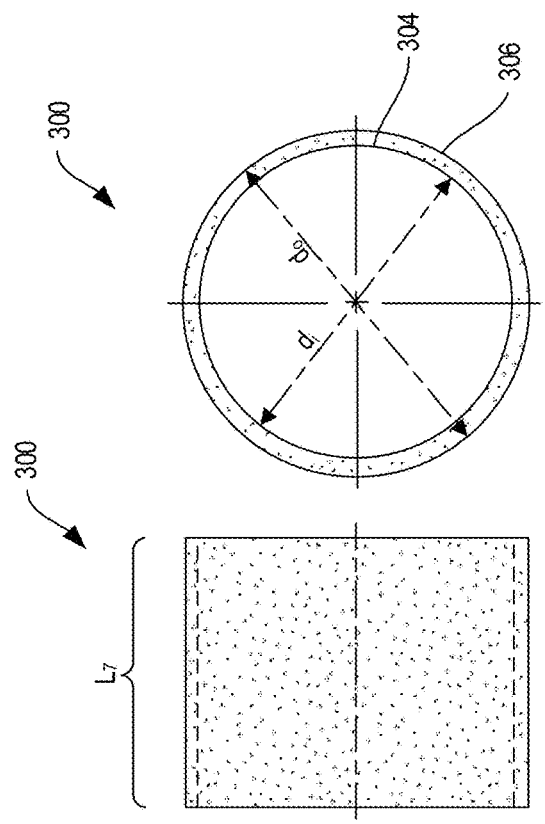
FIG. 3 illustrates a crimp according to one aspect of the present disclosure.

Referring now to FIG. 3, a crimp 300 according to one aspect of the present disclosure is illustrated. The crimp 300 can include a seventh length L7, an inner diameter di and an outer diameter do. In one aspect, the seventh length L7 of the crimp 300 can be the same, or at least substantially the same, as the collective lengths of the first stepped regions 208, the grooves 210, the flat section 216, and the tapered section 218 that define the wick receiving area 212. In one example, embodiment, the seventh length L7 can be 0.5 inches. Other example embodiments are envisioned wherein the seventh length L7 is greater than 0.5 inches (such as 0.75 inches) or less than 0.5 inches (such as 0.25 inches). In one aspect, the crimp 300 can be sized such that a plurality of crimps 300 can be positioned over the wick receiving area 212. In addition, the crimp 300 can be manufactured or any suitable material that is configured to withstand the high operating temperatures of the heat pipe, such as steel or copper, as examples.

Figure 4:
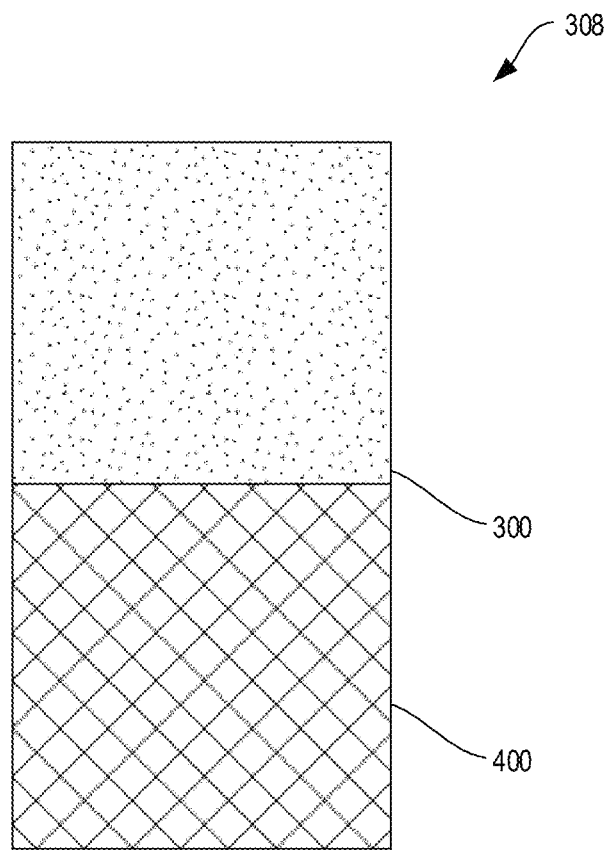
FIG. 4 illustrates a crimp positioned over a wick, according to at least one aspect of the present disclosure.

In one aspect, the inner diameter di of the crimp 300 is designed such that the crimp 300 can slide over a wick 400 to create a wick/crimp assembly 308, as is illustrated in FIG. 4. The inner diameter di is sized with enough necessary clearances such that the wick 400 can slide over the crimp 300, but also fit snuggly around the wick 400. In one example embodiment, the inner diameter di can be 0.580 inches and the outer diameter do can be 0.640 inches, resulting in thickness of 0.06 inches. Other example embodiments are envisioned wherein the thickness of the crimp 300 is greater than 0.06 inches (such as 0.1 inches) or less than 0.06 inches (such as 0.05 inches).

Figure 5:
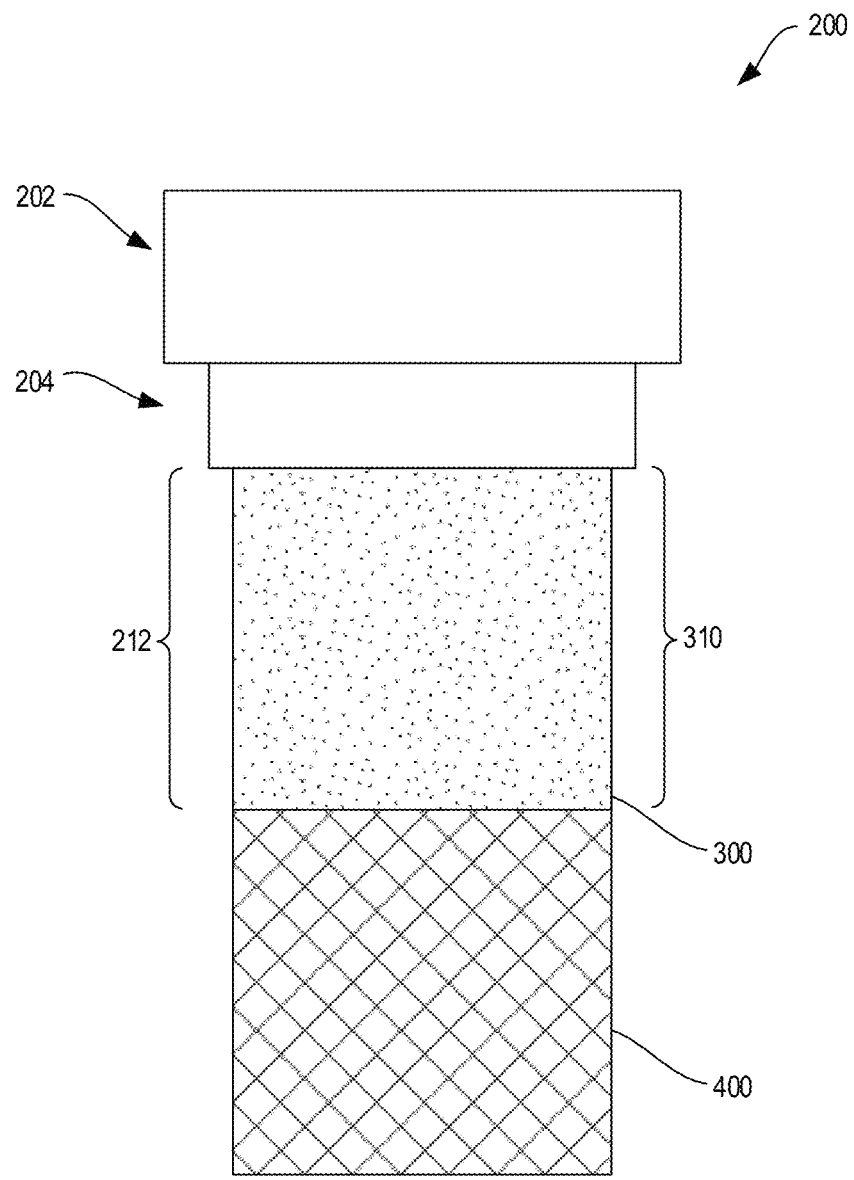
FIG. 5 illustrates a wick/crimp assembly positioned over a wick receiving area of an end plug, according to at least one aspect of the present disclosure.

Once the crimp 300 has been positioned about the wick 400 to form the wick/crimp assembly 308, the wick/crimp assembly 308 is configured to slide over the wick receiving area 212 of the end plug 200, illustrated in FIG. 5. The tapered region 214 is configured to assist in positioning the wick/crimp assembly 308 about the wick receiving area 212 and the intermediate section 204 of the end plug 200 is configured to abut the wick/crimp assembly 308 to prevent the wick/crimp assembly 308 from sliding beyond the wick receiving area 212. Unlike other designs, the profile of the wick receiving area 212, particularly, the first end portions 208 and grooves 210, is straight, allowing a uniform surface contact between the wick 400 and the wick receiving area 212. As illustrated in FIG. 5, the wick/crimp assembly 308 positioned about the wick receiving area 212 of the end plug 200 defines a plug/wick/crimp interface 310.

Figure 6B:
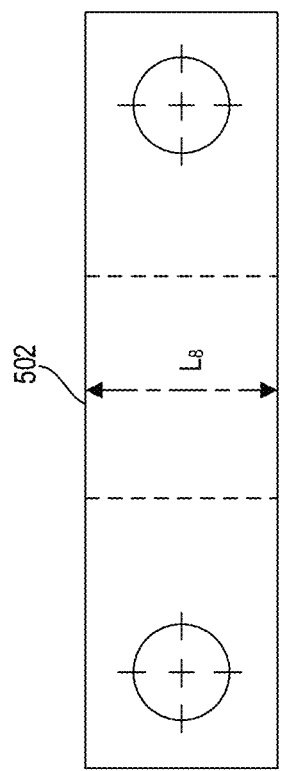
FIG. 6B illustrates a top view of a clam shell clamp of the clamping device, according to at least one aspect of the present disclosure.
Figure 6C:
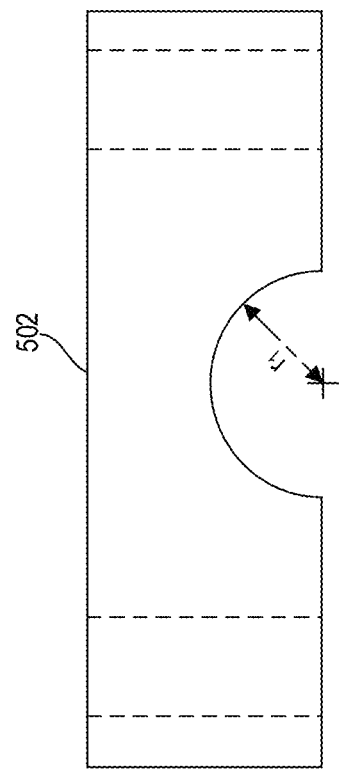
FIG. 6C illustrates a front view of a clam shell clamp of the clamping device, according to at least one aspect of the present disclosure.
Figure 6A:
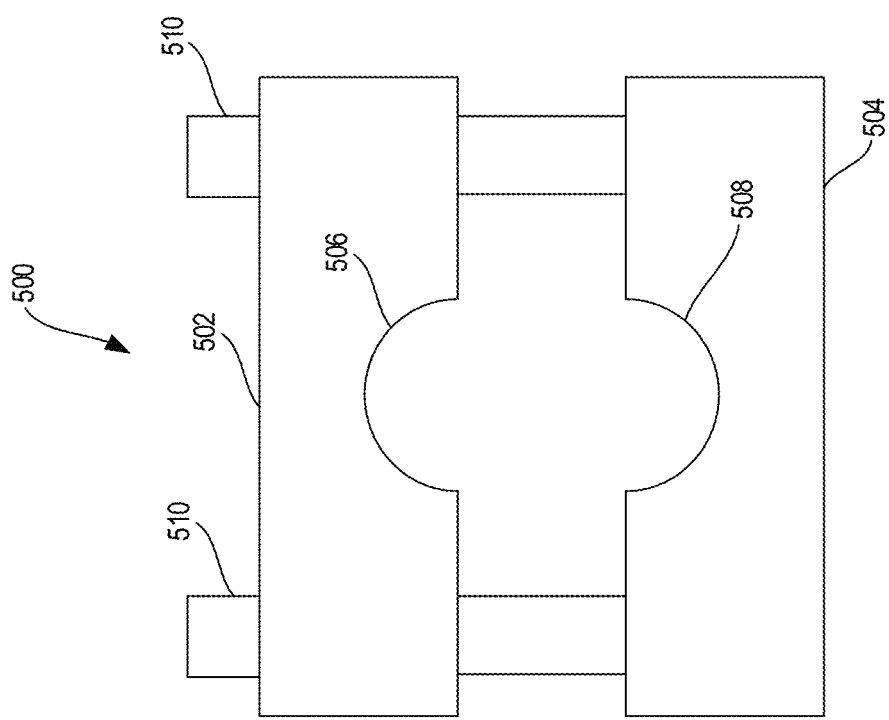
FIG. 6A illustrates a clamping device, according to at least one aspect of the present disclosure.

Referring now to FIG. 6A, a crimping device 500 accordingly to one aspect of the present disclosure is illustrated. The crimping device 500 includes a pair of clam shell clamps 502, 504 and a pair of rods 510 that allow the clam shell clamps 502, 504 to be slidable relative to one another between a spaced position (illustrated in FIG. 6A) and a clamped position (illustrated in FIG. 8). The clam shell clamps 502, 504 each include a receiving surface 506, 508, that are sized and configured to receive the plug/wick/crimp interface 310.

As illustrated in FIG. 6B, the clam shell clamp 502 (or clam shell clamps 504) includes a length L8 that can be the same, or at least substantially the same, as the length of the plug/wick/crimp interface 310. In one example embodiment, the length can be 0.5 inches. In one example embodiment where more than one crimp is positioned about the wick 400 and the wick receiving area 212, the eight length L8 can match the length of the crimp 300 length, i.e., L7. In another example embodiment, the eight length L8 can be greater than the length of the crimp 300 so a user definitively knows that the entire crimp 300 is positioned within the receiving surfaces 506, 508.

Figure 8:
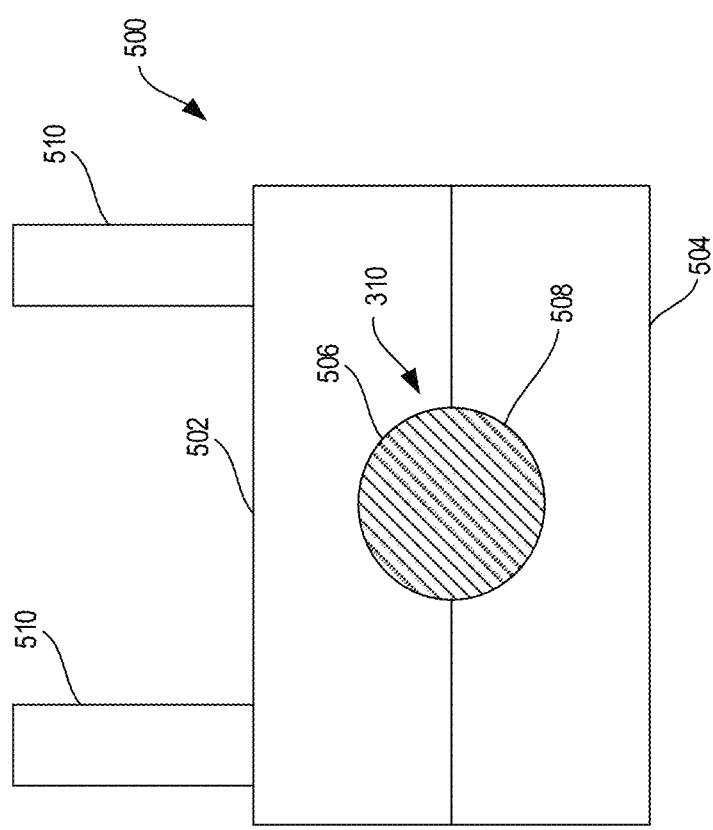
FIG. 8 illustrates a plug/wick/crimp interface within the receiving surfaces of a clam shell clamps with the crimping device in a closed position, according to at least one aspect of the present disclosure.
Figure 9:
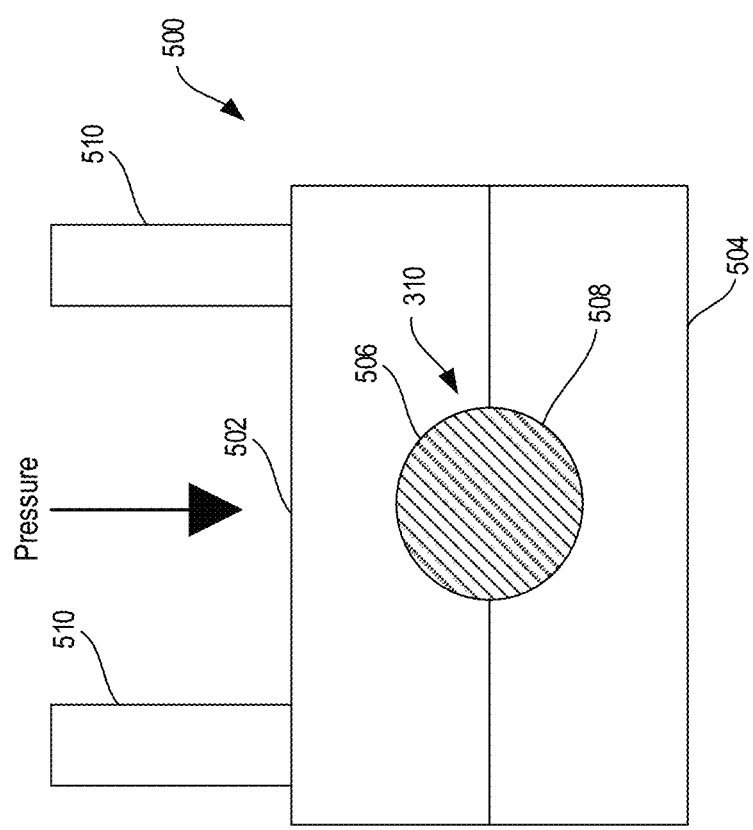
FIG. 9 illustrates a crimping device applying pressure to a plug/wick/crimp interface, according to at least one aspect of the present disclosure.

In addition, as illustrated in FIG. 6C, the clamp shell clamp 502 (or clamp shell clamp 504) includes a radius r1 such the receiving surfaces 506, 508 can, collectively, be snuggly positioned about plug/wick/crimp interface 310 in the clamped position (as illustrated in FIGS. 8 and 9). In one example embodiment, the radius r1 can be 0.597 inches. In another example embodiment, the radius r1 can be identical, or at least substantially identical, to the outside diameter of the crimp 300, i.e., do.

Figure 7:
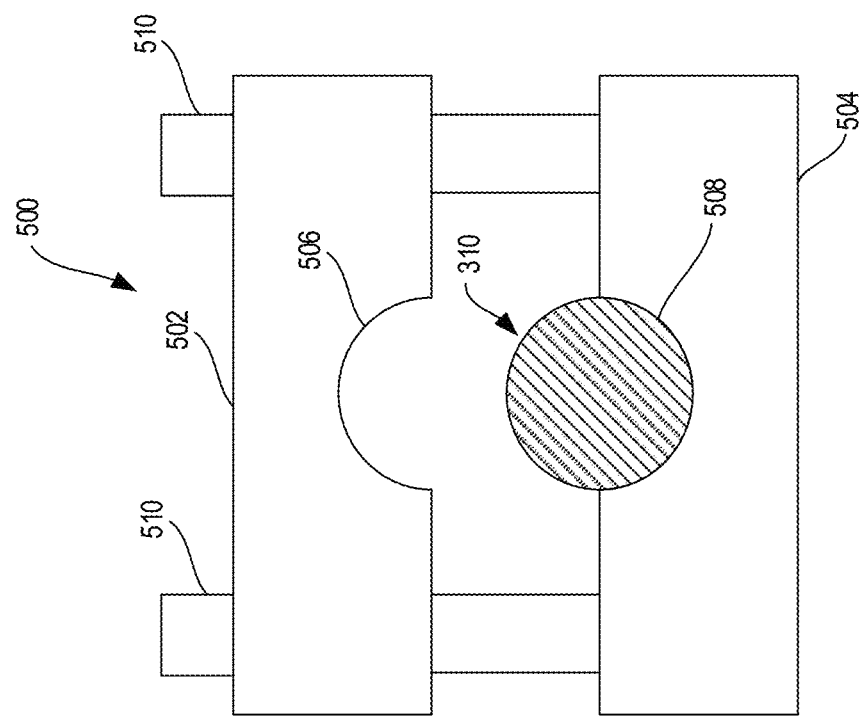
FIG. 7 illustrates a plug/wick/crimp interface within a receiving surface of a clam shell clamp with the crimping device in an open position, according to at least one aspect of the present disclosure.

As illustrated in FIG. 7, the crimping device 500 is configured to receive the plug/wick/crimp interface 310 within the receiving surface 508 of the clam shell clamp 504. Once the plug/wick/crimp interface 310 is positioned within the receiving surface 508, the clam shell clamp 504 is configured to slide along the rods 510 such that the receiving surface 506 of the clam shell clamp 502 is positioned about the plug/wick/crimp interface 310 (FIG. 8). Once clamped between the receiving surfaces 506, 508, referring now to FIG. 9, the crimping device 500 is configured to apply pressure to the plug/wick/crimp interface 310 to crimp the plug/wick/crimp interface 310. Once the plug/wick/crimp interface 310 is crimped, referring now to FIG. 10, an external heat source, such as a furnace, is configured to apply heat to the crimped plug/wick/crimp interface 310, causing the end plug 200, the wick 400, and the crimp 300 to diffusion bond at the plug/wick/crimp interface 310. Diffusion bonding the wick 400 to the end plug 200 enables the wick to hold pressure greater than the expected pressure difference of the operating wick. Diffusion bonding the wick 400 to the end plug 200 does not compromise the wick's 400 ability to perform its intended design functions, such as absorbing and transferring the working fluid from the condenser section of the heat pipe to the evaporator section of the heat pipe. In addition, the use of grooves 210 in the wick receiving area allows for pressure distribution along the wick 400 when it is diffusion bonded to the end plug 200.

For example, portions of the wick 400 that are positioned along first stepped regions 208 will experience a first force from the crimp 300 while portions of the wick 400 that are positioned along grooves 210 will experience a second force from the crimp 300 that is less than the first force as the wick 400 will sag into the groove 210.

Figure 11:
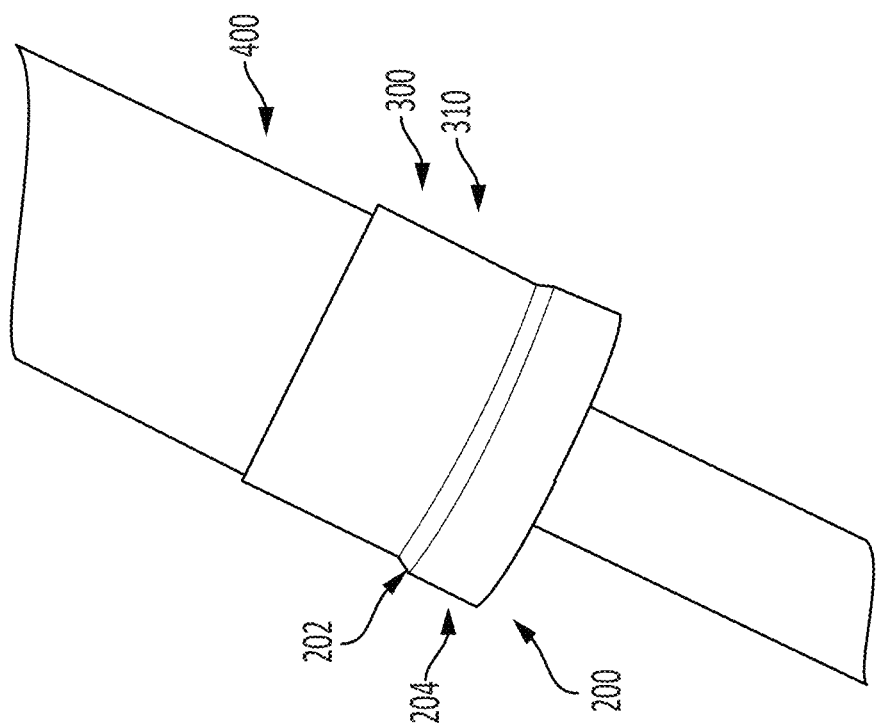
FIG. 11 illustrates a wick assembly undergoing pressure testing, according to at least one aspect of the present disclosure.

Referring now to FIG. 11, a wick assembly is illustrated according to at least one aspect of the present disclosure. As shown, the crimp 300, the wick 400, and the end plug 200 are diffusion bonded together at the plug/wick/crimp interface 310. Once assembled, any suitable pressure testing can be performed to ensure that the plug/wick/crimp arrangement is suitable for its intended application.

Figure 12:
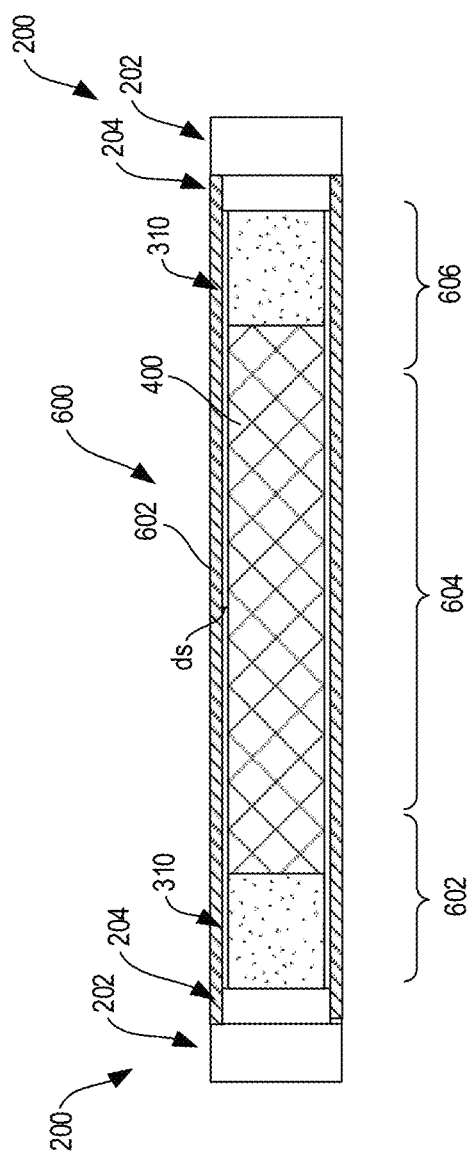
FIG. 12 illustrates a heat pipe including a wick extending along the length thereof and diffusion bonded at both ends to an end plug, according to at least one aspect of the present disclosure.

Referring now to FIG. 12, a heat pipe 600 according to one aspect of the present disclosure is illustrated. The heat pipe 600 includes an evaporator section 602, condenser section 606, along with an adiabatic section 604 extending therebetween. The heat pipe 600 includes two end plugs 200, each positioned on opposite ends of the heat pipe 600. The first end positions 202 are coupled to the inside ends of the heat pipe 600, such as by welding, adhesive, fasteners, or any other various suitable connection. In addition, a wick 400 is diffusion bonded to each of the end plugs 200 at plug/wick/crimp interfaces 310. In another embodiment, only one end of the heat pipe 600 can include a wick 400 that is diffusion bonded to an end plug 200. As shown in FIG. 12, the end plugs 200 maintain the wick 400 a distance ds away the sidewall 602 of the heat pipe 600 such that the wick is centered within the heat pipe 600. The end plugs 200 also help maintain a linear configuration of the wick 400 along the length of the heat pipe 600 from one end plug 200 to the other end plug 200.

Figure 10:
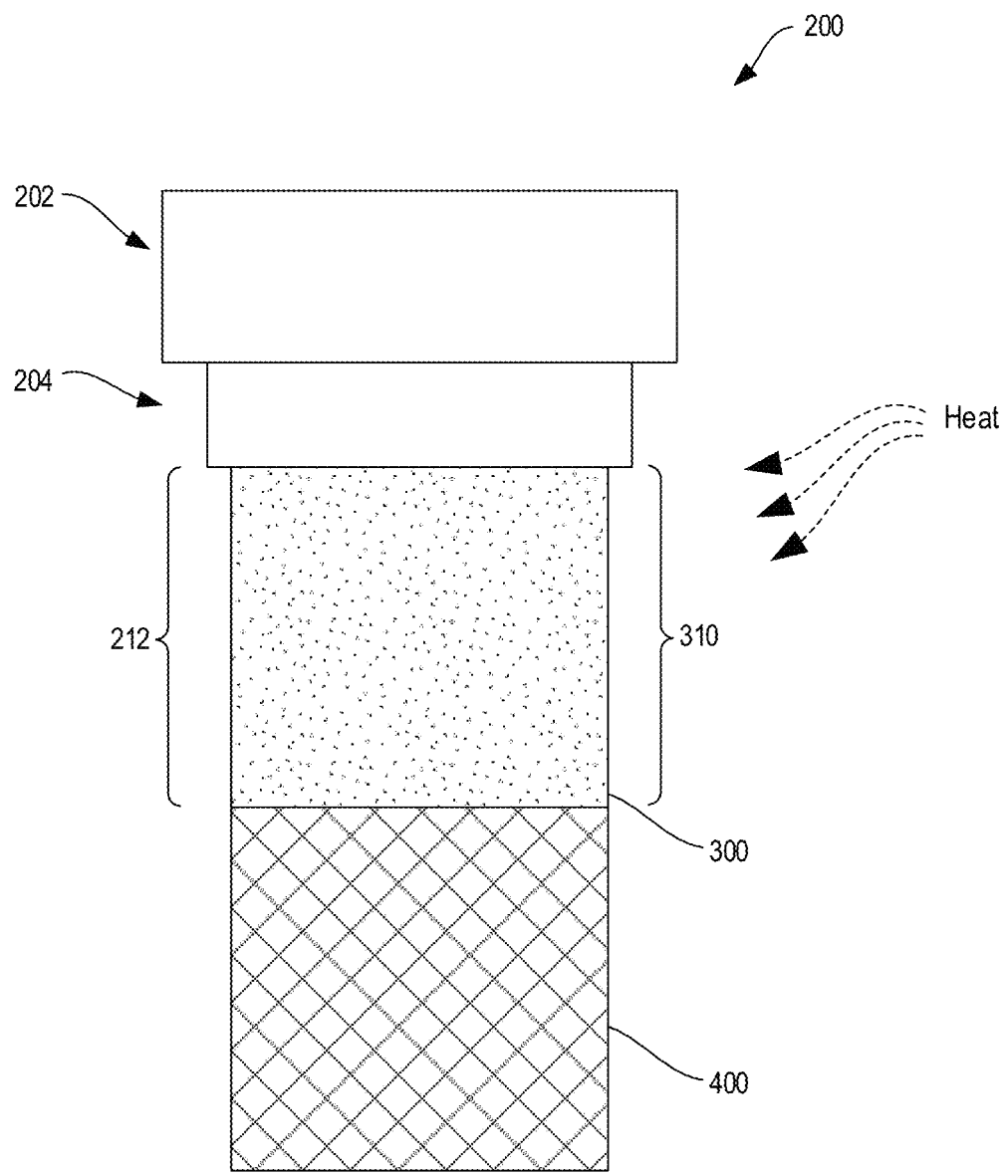
FIG. 10 illustrates an external heat source applying heat to a crimped plug/wick/crimp interface, according to at least one aspect of the present disclosure.
Figure 13:
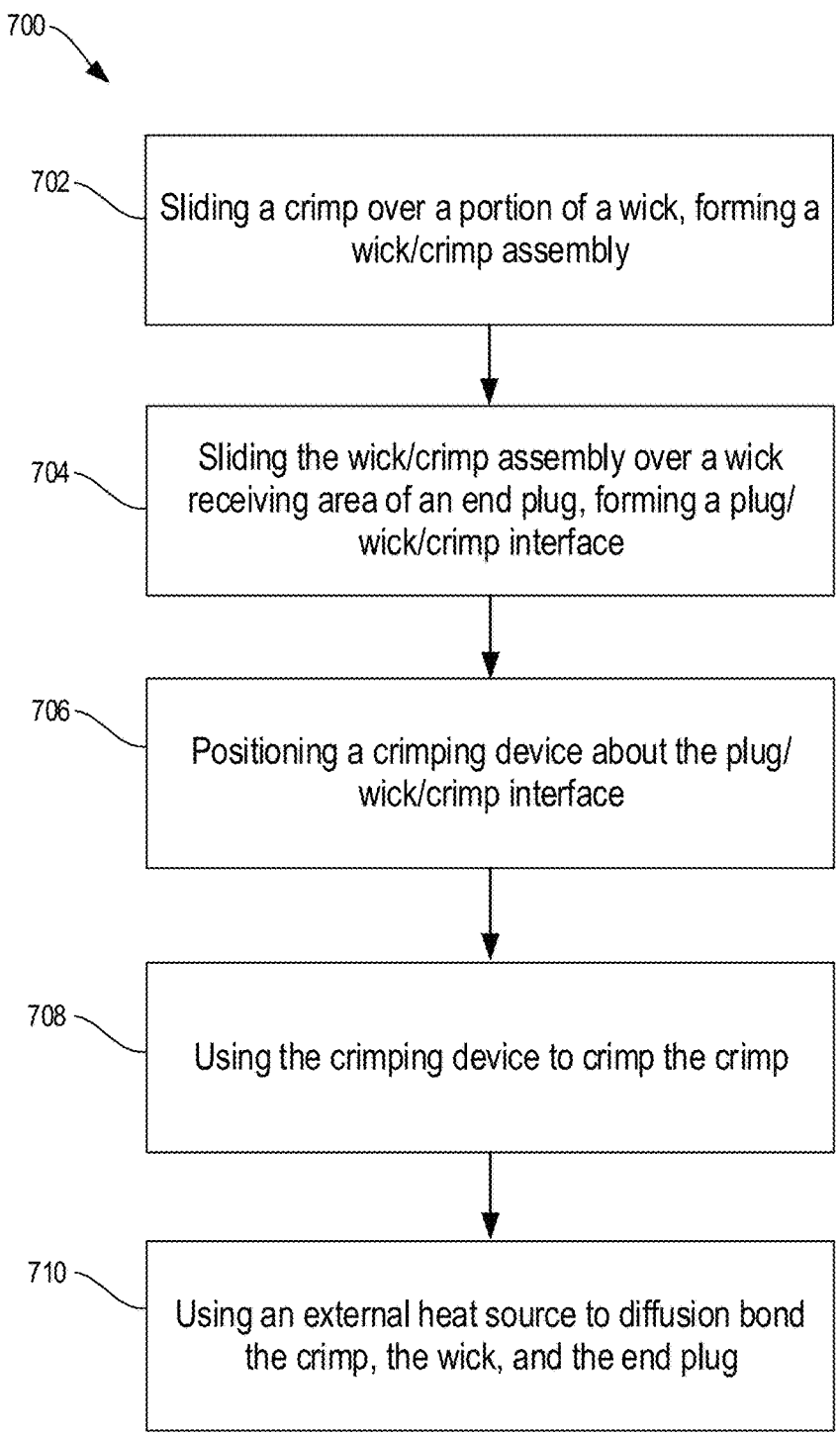
FIG. 13 illustrates a method of constructing a wick assembly, according to at least one aspect of the present disclosure.

Referring now to FIG. 13, a method of constructing a wick assembly 700 is illustrated in accordance with one aspect of the present disclosure. The method includes sliding a crimp over a portion of a wick, forming a wick/crimp assembly 702, such as is illustrated in FIG. 4, as an example. The method also includes sliding the wick/crimp assembly over a wick receiving area of an end plug, forming a plug/wick/crimp interface 704, such as is illustrated in FIG. 5, as an example. The method further includes positioning a crimping device about the plug/wick/crimp interface 706, such as is illustrated in FIGS. 7 and 8, as examples. The method further includes using the crimping device to crimp the crimp 708, such as is illustrated in FIG. 9. The method further includes using an external heat source to diffusion bond the crimp, the wick, and the end plug, such as is illustrated in FIG. 10, as an example.

Various aspects of the subject matter described herein are set out in the following examples.

Example 1—A wick assembly for use with a heat pipe, the wick assembly comprising an end plug comprising a wick receiving area, a wick, wherein a portion of the wick is positioned about the wick receiving area, and a crimp positioned about the portion of the wick and the wick receiving area, wherein the end plug, the portion of the wick, and the crimp are diffusion bonded.

Example 2—The wick assembly of Example 1, wherein the end plug comprises a hollow end plug.

Example 3—The wick assembly of Examples 1 or 2, wherein the end plug comprises an annular end plug.

Example 4—The wick assembly of any one of Examples 1-3, wherein the end plug comprises a metal end plug.

Example 5—The wick assembly of any one of Examples 1-4, wherein the wick receiving area comprises a non-tapered region and a tapered region extending from the non-tapered region.

Example 6—The wick assembly of Example 5, wherein the non-tapered region comprises at least one groove defined therein.

Example 7—The wick assembly of Examples 5 or 6, wherein the non-tapered region comprises two grooves defined therein.

Example 8—The wick assembly of any one of Examples 1-7, wherein the wick comprises an annual wick.

Example 9—The wick assembly of any one of Examples 1-8, wherein the end plug comprises an intermediate section configured to prevent the wick from moving beyond the wick receiving area.

Example 10—The wick assembly of Example 9, wherein the intermediate section is configured to prevent the crimp from moving beyond the wick receiving area.

Example 11—A heat pipe, comprising an evaporator region, an adiabatic region, a condenser region, and a wick assembly, comprising an end plug comprising a first engagement portion, a wick comprising a second engagement portion configured to overlap the first engagement portion, and a crimp comprising a third engagement portion configured to overlap the first engagement portion and the second engagement portion, wherein the first engagement portion, the second engagement portion, and the third engagement portion are diffusion bonded.

Example 12—The heat pipe of Example 11, wherein the wick is configured to extend through the condenser region, the adiabatic region, and the evaporator region.

Example 13—The heat pipe of Examples 11 or 12, wherein the end plug comprises a hollow end plug.

Example 14—The heat pipe of any one of Examples 11-13, wherein the end plug comprises an annular plug.

Example 15—The heat pipe of any one of Examples 11-14, wherein the end plug comprises a metal end plug.

Example 16—The heat pipe of any one of Examples 11-15, wherein the first engagement portion comprises a non-tapered region and a tapered region extending from the non-tapered region.

Example 17—The heat pipe of Example 16, wherein the non-tapered region comprises at least one groove defined therein.

Example 18—The heat pipe of Example 16, wherein the non-tapered region comprises two grooves defined therein.

Example 19—The heat pipe of any one of Examples 11-18, wherein the wick comprises an annular wick.

Example 20—The heat pipe of any one of Examples 11-19, wherein the end plug comprises an intermediate section configured to abut the wick to prevent the second engagement portion from moving beyond the first engagement portion.

Example 21—The heat pipe of Example 20, wherein the intermediate section is configured to abut the crimp to prevent the third engagement portion from moving beyond the first engagement portion.

Example 22—The heat pipe of any one of Examples 11-21, wherein the end plug is a first end plug, wherein the wick assembly further comprises a second end plug.

Example 23—The heat pipe of Example 22, wherein the first end plug and the second end plug are configured to center the wick within the heat pipe.

Example 24—A method of constructing a wick assembly for use with a heat pipe, the method comprising sliding a portion of a wick over a crimp, forming a wick/crimp assembly, sliding the wick/crimp assembly over a wick receiving area of an end plug, forming a plug/wick/crimp interface, positioning a crimping device about the plug/wick/crimp interface, using the crimping device to crimp the crimp, and using an external heat source to diffusion bond the crimp, the wick, and the end plug.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B. and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A. B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises." "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A wick assembly for use with a heat pipe, the wick assembly comprising:
   an end plug comprising a wick receiving area;
   a wick, wherein a portion of the wick is positioned about the wick receiving area; and
   a crimp positioned about the portion of the wick and the wick receiving area, wherein the end plug, the portion of the wick, and the crimp are diffusion bonded.

2. The wick assembly of claim 1, wherein the end plug comprises a hollow end plug.

3. The wick assembly of claim 1, wherein the end plug comprises an annular end plug.

4. The wick assembly of any one of claim 1, wherein the end plug comprises a metal end plug.

5. The wick assembly of any one of claim 1, wherein the wick receiving area comprises a non-tapered region and a tapered region extending from the non-tapered region, and wherein the non-tapered region comprises at least one groove defined therein.

6. The wick assembly of any one of claim 1, wherein the wick comprises an annual wick.

7. The wick assembly of any one of claim 1, wherein the end plug comprises an intermediate section configured to prevent the wick from moving beyond the wick receiving area.

8. The wick assembly of claim 7, wherein the intermediate section is configured to prevent the crimp from moving beyond the wick receiving area.

9. A heat pipe, comprising:
   an evaporator region;
   an adiabatic region;
   a condenser region; and
   a wick assembly, comprising:
      an end plug comprising a first engagement portion;
      a wick comprising a second engagement portion configured to overlap the first engagement portion; and
      a crimp comprising a third engagement portion configured to overlap the first engagement portion and the second engagement portion, wherein the first engagement portion, the second engagement portion, and the third engagement portion are diffusion bonded.

10. The heat pipe of claim 9, wherein the wick is configured to extend through the condenser region, the adiabatic region, and the evaporator region.

11. The heat pipe of claim 9, wherein the end plug comprises a hollow end plug.

12. The heat pipe of any one of claim 9, wherein the end plug comprises an annular plug.

13. The heat pipe of any one of claim 9, wherein the end plug comprises a metal end plug.

14. The heat pipe of any one of claim 9, wherein the first engagement portion comprises a non-tapered region and a tapered region extending from the non-tapered region, and wherein the non-tapered region comprises at least one groove defined therein.

15. The heat pipe of any one of claim 9, wherein the wick comprises an annular wick.

16. The heat pipe of any one of claim 9, wherein the end plug comprises an intermediate section configured to abut the wick to prevent the second engagement portion from moving beyond the first engagement portion.

17. The heat pipe of claim 16, wherein the intermediate section is configured to abut the crimp to prevent the third engagement portion from moving beyond the first engagement portion.

18. The heat pipe of any one of claim 9, wherein the end plug is a first end plug, wherein the wick assembly further comprises a second end plug.

19. The heat pipe of claim 18, wherein the first end plug and the second end plug are configured to center the wick within the heat pipe.

20. A method of constructing a wick assembly for use with a heat pipe, the method comprising:
- sliding a portion of a crimp over a wick, forming a wick/crimp assembly;
- sliding the wick/crimp assembly over a wick receiving area of an end plug, forming a plug/wick/crimp interface;
- positioning a crimping device about the plug/wick/crimp interface;
- using the crimping device to crimp the crimp; and
- using an external heat source to diffusion bond the crimp, the wick, and the end plug.

* * * * *

UNITED STATES PATENT AND TRADEMARK OFFICE
CERTIFICATE OF CORRECTION

| | | |
|---|---|---|
| PATENT NO. | : 11,709,022 B2 | Page 1 of 1 |
| APPLICATION NO. | : 17/904732 | |
| DATED | : July 25, 2023 | |
| INVENTOR(S) | : David M. Gross | |

It is certified that error appears in the above-identified patent and that said Letters Patent is hereby corrected as shown below:

In the Specification

Column 1, Lines 18-20, delete "This invention was made with government support under Contract FOA-1817 awarded by the Department of Energy. The government has certain rights in the invention." and insert -- This invention was made with government support under Contract DE-NE0008853 awarded by the Department of Energy. The government has certain rights in the invention. --.

Signed and Sealed this
Thirteenth Day of May, 2025

Coke Morgan Stewart
*Acting Director of the United States Patent and Trademark Office*